United States Patent
Kang et al.

(10) Patent No.: US 8,634,378 B2
(45) Date of Patent: Jan. 21, 2014

(54) METHOD AND APPARATUS FOR RANGING IN BROADBAND WIRELESS ACCESS COMMUNICATION SYSTEM

(75) Inventors: Hyon-Goo Kang, Suwon-si (KR); Jae-Hyok Lee, Yongin-si (KR); Ki-Young Han, Yongin-si (KR); In-Seok Hwang, Seoul (KR); Yong-Seok Kim, Hwaseong-si (KR); Byoung-Ha Yi, Seoul (KR); Byoung-Gi Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 12/658,291

(22) Filed: Feb. 5, 2010

(65) Prior Publication Data
US 2010/0202282 A1    Aug. 12, 2010

(30) Foreign Application Priority Data

Feb. 6, 2009   (KR) .......................... 10-2009-0009881

(51) Int. Cl.
*H04W 4/00*   (2009.01)
(52) U.S. Cl.
USPC ............ 370/331; 370/324; 455/434; 713/155

(58) Field of Classification Search
USPC ................. 370/203, 329, 330, 331, 342, 324; 455/434, 436, 456.1; 713/155
See application file for complete search history.

(56) References Cited

U.S. PATENT DOCUMENTS

| | | | |
|---|---|---|---|
| 2003/0026223 A1* | 2/2003 | Eriksson et al. | 370/335 |
| 2005/0030931 A1* | 2/2005 | Sung et al. | 370/342 |
| 2006/0126580 A1* | 6/2006 | Katsumata et al. | 370/338 |
| 2009/0197599 A1* | 8/2009 | Cho et al. | 455/434 |
| 2009/0201877 A1* | 8/2009 | Noh et al. | 370/330 |
| 2010/0111011 A1* | 5/2010 | Chen et al. | 370/329 |
| 2011/0149947 A1* | 6/2011 | Kim et al. | 370/350 |

* cited by examiner

*Primary Examiner* — Kwang B Yao
*Assistant Examiner* — Awet Haile

(57) ABSTRACT

An apparatus and operation method of a Mobile Station (MS) for ranging in a broadband wireless access communication system includes receiving information for ranging code hopping from a Base Station (BS). The MS determines a hopping offset value that is a start of a ranging codes group using the information for ranging code hopping. The MS also determines a ranging codes group using the hopping offset value, and randomly selects at least one or more ranging codes among the determined ranging codes group and transmitting the selected ranging codes to the BS.

30 Claims, 5 Drawing Sheets

METHOD AND APPARATUS FOR RANGING IN BROADBAND WIRELESS ACCESS COMMUNICATION SYSTEM

CROSS-REFERENCE TO RELATED APPLICATION(S) AND CLAIM OF PRIORITY

The present application claims the benefit under 35 U.S.C. §119 to an application filed in the Korean Intellectual Property Office on Feb. 6, 2009 and assigned Serial No. 10-2009-0009881, the contents of which are herein incorporated by reference.

TECHNICAL FIELD OF THE INVENTION

The present invention relates to a scheme for supporting efficient ranging in a broadband wireless access communication system. More particularly, the present invention relates to a method and apparatus for performing ranging through a ranging code hopping in a Mobile Station (MS) initial network entry or handover re-entry process to efficiently use wireless resources, and performing an admission control in a broadband wireless access communication system.

BACKGROUND OF THE INVENTION

An Institute of Electrical and Electronics Engineers (IEEE) 802.16 working group has conducted a research on a high speed wireless Internet service in a broadband wireless access communication system. The broadband wireless access communication system is distinguished into an Orthogonal Frequency Division Multiplexing (OFDM) scheme and an Orthogonal Frequency Division Multiple Access (OFDMA) scheme.

A procedure of network entry of an MS in a general broadband wireless communication system is described. As being powered on, the MS receives a preamble of a DownLink (DL) frame broadcasted in a Base Station (BS) and acquires a system synchronization with the BS. Then, the MS analyzes a DL Channel Descriptor (DCD) message, an UpLink (UL) Channel Descriptor (UCD) message, a DL_MAP message, and a UL_MAP message, and acquires a DL and UL Media Access Control (MAC) synchronization with the BS.

After that, the MS transmits an initial ranging Code Division Multiple Access (CDMA) code acquired through the UCD message to the BS, receives a ranging-response (RNG-RSP) message from the BS to adjust timing and power, and acquires a ranging synchronization with the BS. Next, the MS transmits a ranging-request (RNG-REQ) message to the BS and receives an RNG-RSP message from the BS in response to the RNG-REQ message to set a basic management connection and primary management connection with the BS. Here, the BS can perform an admission control as to whether to permit or reject an MS's network entry. That is, because the RNG-REQ message includes a MAC address of an MS, the BS can store a list of MAC addresses of MSs whose entries are permitted by the BS or store a list of MAC addresses of MSs whose entries are rejected by the BS. In this case, the BS can perform the admission control using the list of MAC addresses.

Then, the MS performs an authentication operation with the BS and acquires an encryption key (i.e., a Traffic Encryption Key (TEK)) allocated to the MS. At this time, the BS can perform an admission control over the MS. That is, the MS communicates with an authentication server through contents within an authentication message. The BS can receive a notification of its result from the authentication server and perform the admission control on the MS.

After that, the MS sends a registration request to the BS and, upon registration completion, performs basic traffic connection (i.e., default transport connection) setup for transmitting/receiving a control message of an upper layer and performs Internet Protocol (IP) connection setup, thereby completing a network entry procedure.

Alternatively, the MS performs handover whenever there is a change of a cell area in the broadband wireless access communication system. A handover procedure is described. The MS receives information on neighboring BSs from a serving BS that provides a service. On the basis of this information, the MS measures a broadcast signal delivered from the serving BS and broadcast signals delivered from the neighboring BSs, and sends a handover request to the serving BS. At this time, when the MS sends the handover request, the serving BS inquires of the neighboring BSs if a handover of the MS is acceptable to the neighboring BSs.

The neighboring BSs determine if the handover of the MS is acceptable to the neighboring BSs, and report its results to the serving BS. The serving BS gathers information on neighboring BSs enabling handover from the neighboring BSs, and delivers the gathered information to the MS through a handover response message. Here, the neighboring BS can perform an admission control on the MS. In this case, the neighboring BS identifies a service level of the MS intending for handover, and performs an admission control on the basis of the existence or absence of resources utilizable in a corresponding cell. Alternately, on the basis of a MAC address of the MS, the neighboring BS can perform the same admission control as an admission control in an MS's initial entry procedure.

After that, the MS selects a target BS among neighboring BSs enabling handover, performs synchronization with the target BS, and performs a ranging procedure. Here, like the network entry procedure, at the time of performing the ranging procedure, the BS can identify the MAC address of the MS, and perform the admission control on the MS.

As described above, a BS can perform an admission control on an MS in a network entry procedure or handover procedure.

However, in the conventional ranging procedure, a ranging codes group used between an MS and a BS is fixed and thus, the BS suffers a serious hindrance from a jamming signal by a malicious MS. That is, if the malicious MS seamlessly transmits a meaningless ranging code to attack a BS, the BS cannot make preparations for this attack and in addition, is difficult to provide a smooth service to a non-malicious MS. Also, in a conventional admission control way, the BS cannot perform admission control determination until being at least allocated resources necessary for a ranging procedure from an MS.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, one aspect of the present invention is to provide a ranging method and apparatus using a ranging code hopping a ranging code hopping in a broadband wireless access communication system.

Another aspect of the present invention is to provide a ranging method and apparatus for an admission control in a broadband wireless access communication system.

A further aspect of the present invention is to provide a method and apparatus for processing a jamming signal in a broadband wireless access communication system.

Yet another aspect of the present invention is to provide a method and apparatus for performing an admission control in a physical layer in a broadband wireless access communication system.

The above aspects are achieved by providing a method and apparatus for ranging in a broadband wireless access communication system.

According to one aspect of the present invention, an operation method of a Base Station (BS) for ranging in a broadband wireless access communication system is provided. The method includes transmitting information for ranging code hopping, to a Mobile Station (MS), determining a hopping offset that is a start of a ranging codes group using the information for ranging code hopping, determining a ranging codes group using the hopping offset value, and comparing at least one or more ranging codes of the determined ranging codes group with ranging codes transmitted by the MS.

According to another aspect of the present invention, an operation method of an MS for ranging in a broadband wireless access communication system is provided. The method includes receiving information for ranging code hopping from a BS, determining a hopping offset value that is a start of a ranging codes group using the information for ranging code hopping, determining a ranging codes group using the hopping offset value, and randomly selecting at least one or more ranging codes among the determined ranging codes group and transmitting the selected ranging codes to the BS.

According to a further aspect of the present invention, an operation method of a BS for ranging in a broadband wireless access communication system is provided. The method includes receiving a ranging code from an MS every hopping period, every hopping period, comparing the received ranging code of the MS with at least one or more ranging codes of a ranging codes group by ranging code hopping, and, when the received ranging code of the MS is not included in the ranging codes group by the ranging code hopping during a predetermined comparison count, setting such that the received ranging code of the MS is not included within the ranging codes group.

According to a further another aspect of the present invention, a BS apparatus for ranging in a broadband wireless access communication system is provided. The apparatus includes a transmitter, a hopping offset determiner, a code determiner, and a controller. The transmitter transmits information for ranging code hopping, to an MS. The hopping offset determiner determines a hopping offset that is a start of a ranging codes group using the information for ranging code hopping. The code determiner determines a ranging codes group using the hopping offset value. The controller compares at least one or more ranging codes of the determined ranging codes group with ranging codes transmitted by the MS.

According to a yet another aspect of the present invention, an MS apparatus for ranging in a broadband wireless access communication system is provided. The apparatus includes a receiver, a hopping offset determiner, a code determiner, and a controller. The receiver receives information for ranging code hopping from a BS. The hopping offset determiner determines a hopping offset value that is a start of a ranging codes group using the information for ranging code hopping. The code determiner determines a ranging codes group using the hopping offset value. The controller randomly selects at least one or more ranging codes among the determined ranging codes group and transmits the selected ranging codes to the BS.

According to a still another aspect of the present invention, a BS apparatus for ranging in a broadband wireless access communication system is provided. The apparatus includes a receiver and a controller. The receiver receives a ranging code from an MS every hopping period. Every hopping period, the controller compares the received ranging code of the MS with at least one or more ranging codes of a ranging codes group by ranging code hopping and, when the received ranging code of the MS is not included in the ranging codes group by the ranging code hopping during a predetermined comparison count, sets such that the received ranging code of the MS is not included within the ranging codes group.

According to a still another aspect of the present invention, a method for ranging in a broadband wireless access communication system is provided. The method includes determining a ranging code hopping period, when it is the ranging code hopping period, determining a hopping offset that is a start of a ranging codes group using information for ranging code hopping, and changing the start of the ranging codes group using the hopping offset value.

According to a still another aspect of the present invention, an operation method of a BS for ranging in a broadband wireless access communication system is provided. The method includes receiving a ranging code from an MS, identifying if the received ranging code is included in a corresponding ranging codes group changed every period by ranging code hopping, counting the number of times in which the received ranging code is not included in the corresponding ranging codes group, and, if the number of times in which the received ranging code is not included in the corresponding ranging codes group is equal to or is more than a predetermined number of times, notifying an operator of its result.

According to a still another aspect of the present invention, an operation method of a BS for ranging in a broadband wireless access communication system is provided. The method includes receiving a ranging code from an MS; and identifying if the received ranging code is included in a corresponding ranging codes group changed every period by ranging code hopping, and performing an admission control for the MS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of certain exemplary embodiments of the present invention will be more apparent from the following description taken in conjunction with the accompanying drawings in which.

DETAILED DESCRIPTION OF THE INVENTION

Figure 1:
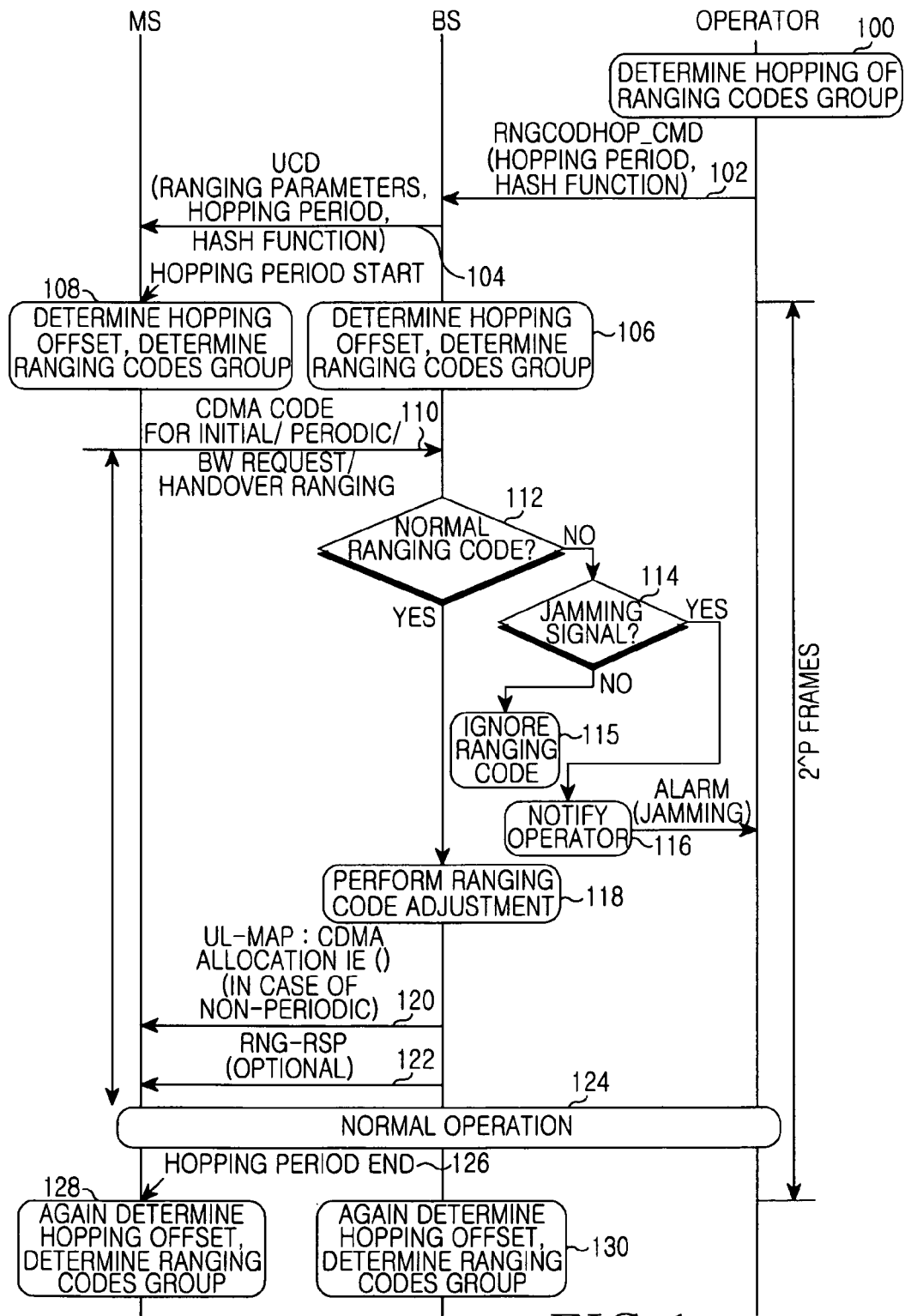
FIG. 1 illustrates a ranging process for a ranging code hopping in a broadband wireless access communication system according to an exemplary embodiment of the present invention.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

A ranging method and apparatus using a ranging code hopping in a broadband wireless access communication system according to an exemplary embodiment of the present invention are described below. Particularly, a way to improve a ranging procedure, make preparations for a ranging code attack of a malicious Mobile Station (MS), and perform an admission control in a physical layer is proposed.

A Base Station (BS) supporting a ranging code hopping proposed in the present invention includes a Type/Length/Value (TLV) field shown in Table 1 below, in an UpLink (UL) Channel Descriptor (UCD) message. If the TLV is not included, an MS can determine that the BS does not support the ranging code hopping.

TABLE 1

| Syntax | Type | Length | Value |
|---|---|---|---|
| Hopping of Ranging Codes Group | TBD | 4 | Bit#0: Hopping Indicator<br>1: The BS hops the Ranging Codes Group.<br>0: The BS does not hop the Ranging Codes Group. In this case, the other value<br>Bit#1~#5: Hopping Period (p)<br>The BS hops the Ranging Codes Group every $2^p$ frames.<br>Bit#6~#7: Hopping Function Indicator<br>0b00: 8-bits hash function<br>0b01: 16-bits hash function<br>0b10: 24-bits hash function<br>0b11: vendor specific hash function<br>Bit#8~#31: Hash Polynomial |
| Vendor Specific Hash Function for Hopping | TBD | var | Hash Polynomial |

In Table 1, the 'hopping of ranging codes group' can include information on a hopping indicator indicating supporting or non-supporting of a ranging code hopping, a hopping period (p), and a hopping function indicator indicating a hash function for the ranging code hopping. The hopping indicator, the hopping period (p), and the hopping function indicator may be realized by each TLV field.

For example, if a value of the hopping function indicator is not equal to '0b11', an MS determines a hopping offset (H) as given in Equation 1 below.

$$H = f(BSID|F_p) | \mod 256 \qquad (1)$$

In Equation 1, the 'BSID' is an IDentification (ID) of a BS, the 'mod' means a modular operation, the 'f(•)' is a function defined according to the hash polynomial defined in the 'Bit#8~#31' of the 'hopping of ranging codes group', and the '$F_p$' is Most Significant Bit (MSB) (24-p) bits of a frame number. That is, the '$F_p$' is an MSB (24-p) value from bits (e.g., 24 bits) of a corresponding frame number, and the 'p' is a hopping period defined in the 'Bit#1~#5' of the 'hopping of ranging codes group'.

In other words, the hopping offset (H) is determined by taking the 'BSID' and the '$F_p$' as successive input variables and using the hash function 'f(•)' defined according to the hash polynomial defined in the 'Bit#8~#31' of the 'hopping of ranging codes group'.

The hopping offset (H) is a start of a ranging codes group of a current frame, and a group of ranging codes is each defined as follows.

S=Start of Ranging Codes Group, 0≤S≤255
N=Initial Ranging Codes
M=Periodic Ranging Codes
L=Bandwidth Request Ranging Codes
O=Handover Ranging Codes All ranging codes used in a UL are in a group between ((S+H) mod 256) and ((S+H+N+M+L+O) mod 256).

The first N codes produced are for initial-ranging (((S+H) mod 256) and ((S+H+N) mod 256)).

The next M codes produced are for periodic-ranging ((S+H) mod 256) and ((S+H+N+M) mod 256).

The next L codes produced are for bandwidth-requests ((S+H) mod 256) and ((S+H+N+M+L) mod 256).

The next O codes produced are for handover-ranging ((S+H) mod 256) and ((S+H+N+M+L+O) mod 256).

Accordingly, the BS supporting the ranging code hopping decodes the ranging codes group and provides a service to an MS. That is, the BS allocates system resources to perform a subsequent procedure for ranging codes within the ranging codes group.

If not decoding for ranging codes out of the ranging codes group, the BS does not allocate system resources. That is, the BS does not permit the ranging codes out of the ranging code group. If the ranging codes out of the ranging codes group are continuously transmitted, the BS determines the ranging codes out of the ranging codes group as a jamming signal and informs a system operator according to a determined operation scheme.

Alternatively, if a value of the 'hopping function indicator' defined in the 'Bit#6~#7' of the 'hopping of ranging codes group' is received as '0b11', an MS determines a hopping offset (H') by Equation 2 below.

$$H = g(Dot16KDF(BSID|K|F_p, 64)) \mod 256 \quad (2)$$

In Equation 2, the 'g(x)' is a function defined according to the hash polynomial defined in the 'vendor specific hash function for hopping' field, the ' K' is a hopping offset key, and the '$F_p$' is MSB (24-p) bits of a corresponding frame number. The 'Dot16KDF' represents a key derivation function.

That is, the hopping offset (H') is determined by taking the 'BSID', the 'K', and the '$F_p$' as successive input variables and using the function (g(x)) defined according to the hash polynomial defined in the 'vendor specific hash function for hopping TLV' field. And, the hopping offset key (K) is a value predefined and shared between a BS and an MS, and can be shared in a process of registering an MS whose entry to a corresponding BS is permitted to an entry permission list (i.e., a white list).

FIG. 1 illustrates a ranging process using a ranging code hopping in a broadband wireless access communication system according to an exemplary embodiment of the present invention.

Referring to FIG. 1, in step 100, an operator determines hopping of a ranging codes group and, in step 102, provides hopping period and hash function information necessary for the ranging codes group hopping to a BS through a control command. Here, the hopping of the ranging codes group determines a variable ranging codes group, randomly selects a ranging code within the determined ranging codes group, and periodically changes the ranging code.

Then, in step 104, during a synchronization process, the BS provides information on a hopping period for the hopping of the ranging codes group determined by the operator, a hash function, and ranging parameters shown in Table 1, to an MS through a control channel such as a UCD.

Then, in steps 106 and 108, the BS and the MS each determine hopping offsets using the hopping period and the hash function, and determine ranging codes groups using the hopping offsets as given in Equations 1 and 2. The hopping offset represents a start of a ranging codes group used in the whole ranging codes group. Here, a first ranging codes group denotes the ranging codes group determined by the BS, and a second ranging codes group denotes the ranging codes group determined by the MS. The first ranging codes group and the second ranging codes group are calculated using the same hopping period and hash function and thus, are identical with each other.

Then, in step 110, the MS randomly selects one ranging code from the second ranging codes group for performing a initial ranging, a periodic ranging, a bandwidth request or a handover, and transmits the selected ranging code to the BS.

Then, in step 112, the BS identifies if the ranging code transmitted by the MS is within the first ranging codes group, identifying if the transmitted ranging code is equal to a normal code.

If the ranging code transmitted by the MS is within the first ranging codes group in step 112, the BS performs a normal operation according to a predefined procedure. That is, the BS proceeds to step 118 and performs ranging code adjustment, thus controlling power of the MS or adjusting a time offset or frequency offset.

Then, in step 120, when ranging is not periodic, the BS transmits a Code Division Multiple Access (CDMA) Allocation Information Element (IE) to the MS. Then, in step 122, the BS can also optionally transmit a ranging response (RNG-RSP) message to the MS.

Then, in step 124, the MS and the BS perform a general operation.

Then, if a hopping period ends in step 126, in steps 128 and 130, the MS and the BS each determine hopping offsets and ranging codes groups, and use determined ranging codes.

Alternatively, when the ranging code transmitted by the MS is out of the first ranging codes group in step 112, the BS proceeds to step 114 and determines if the ranging code transmitted by the MS is a jamming signal. That is, the BS determines if a malicious MS periodically transmits a ranging code.

If the ranging code transmitted by the MS is determined not to be the jamming signal in step 114, the BS proceeds to step 115 and ignores the ranging code received from the MS and operates in a corresponding mode.

Alternatively, when the ranging code transmitted by the MS is determined to be the jamming signal in step 114, the BS proceeds to step 116 and sends the operator a notification of ranging code information corresponding to the jamming signal. Here, the operator sets ranging hopping information such that the ranging code determined to be the jamming signal is not included in the ranging codes group, thus preventing the MS from later using the ranging codes determined to be the jamming signal.

Figure 2:
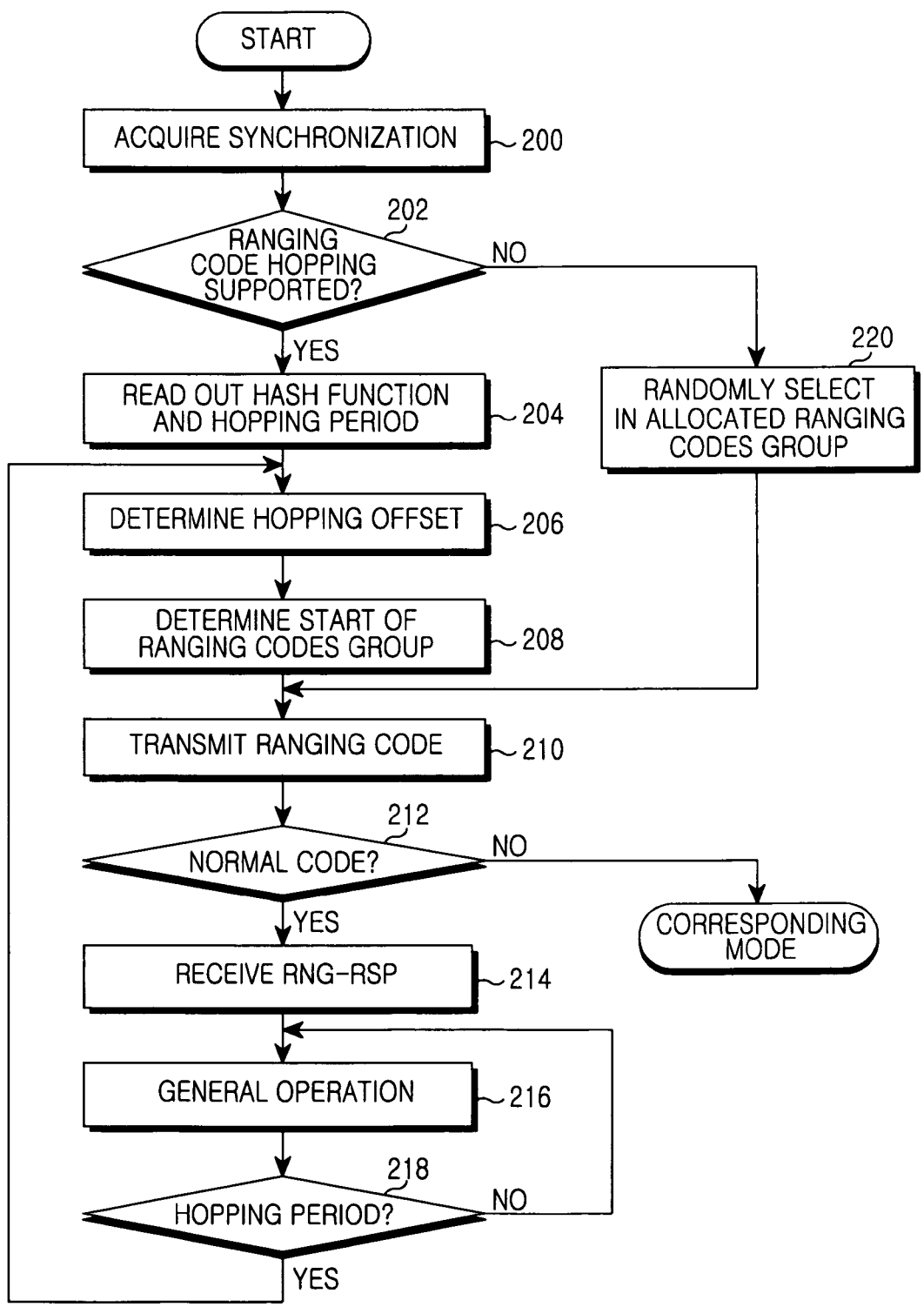
FIG. 2 illustrates a Mobile Station (MS) operation for ranging for a ranging code hopping in a broadband wireless access communication system according to an exemplary embodiment of the present invention.

FIG. 2 illustrates an MS operation for ranging for a ranging code hopping in a broadband wireless access communication system according to an exemplary embodiment of the present invention.

Referring to FIG. 2, in step 200, an MS acquires an initial synchronization with a BS, and acquires information for ranging code hopping shown in Table 1.

Then, in step 202, the MS identifies supporting or non-supporting of ranging code hopping using the information for ranging code hopping.

If not supporting the ranging code hopping in step 202, the MS proceeds to step 220 and randomly selects a code from an allocated ranging codes group. That is, the MS randomly selects a code from a corresponding group among a predefined initial ranging codes group, a predefined periodic ranging codes group, a predefined bandwidth request ranging codes group, and a predefined handover ranging codes group.

Alternatively, if supporting the ranging code hopping in step 202, the MS proceeds to step 204 and reads out hash function and hopping period information from the information for ranging code hopping. Then, in step 206, the MS determines a hopping offset using Equation 1 or Equation 2. Then, in step 208, the MS determines a start of a ranging codes group.

Then, in step 210, the MS randomly selects at least one or more ranging codes from the ranging codes group determined in steps 204 to 208, and transmits the selected ranging codes to the BS.

Then, if it is determined to be a normal ranging code by the BS in step 212, i.e., if the ranging code determined by the MS is included in a ranging codes group determined by the BS, the MS proceeds to step 214 and receives an RNG-RSP message from the BS. Then, in step 216, the MS performs a general operation.

Then, if a hopping period ends in step 218, the MS returns to step 216 and continuously performs a general operation. Alternatively, if the hopping period does not end, the MS returns to step 206 and again determines a hopping offset and determines a start of a ranging codes group. That is, the MS determines a hopping offset and changes a ranging code, every hopping period.

Figure 3:
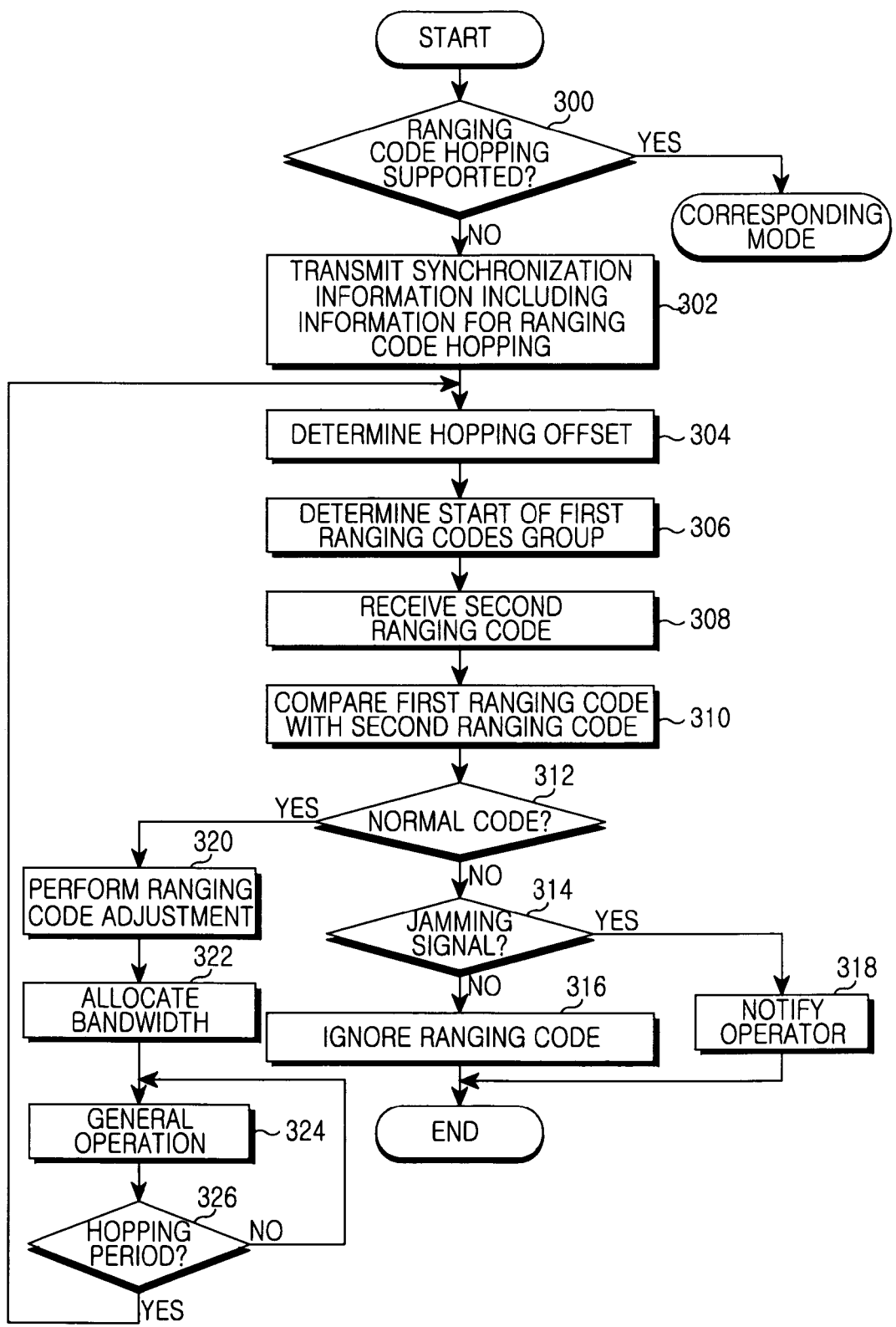
FIG. 3 illustrates a Base Station (BS) operation for ranging for a ranging code hopping in a broadband wireless access communication system according to an exemplary embodiment of the present invention.

FIG. 3 illustrates a BS operation for ranging for a ranging code hopping in a broadband wireless access communication system according to an exemplary embodiment of the present invention.

Referring to FIG. 3, if supporting a ranging code hopping in step 300, the BS proceeds to step 302 and transmits synchronization information including information for ranging code hopping shown in Table 1. The information for ranging code hopping can be provided by an operator or be provided as a default.

Then, in step 304, the BS determines a hopping offset using the information for ranging code hopping and, in step 306, determines a start of a ranging codes group using the determined hopping offset.

Then, in step 308, the BS receives a second ranging code transmitted from an MS.

Then, in step 310, the BS compares the second ranging code transmitted from the MS with first ranging codes of the ranging codes group determined by the BS itself.

Then, if it is determined to be a normal ranging code in step 312, i.e., if the ranging code transmitted from the MS is included in the ranging codes group determined by the BS itself, the BS proceeds to step 320 and performs ranging code adjustment. Then, in step 322, the BS transmits a CDMA_Allocation_IE to the MS and allocates a bandwidth. Then, in step 324, the BS performs a general operation.

Then, if a hopping period ends in step 326, the BS returns to step 324 and continuously performs the general operation. Alternatively, if the hopping period does not end, the BS returns to step 304 and again determines a hopping offset and determines a ranging codes group.

Alternatively, if it is determined not to be a normal code in step 312, i.e., if the ranging code transmitted from the MS is not included in the ranging codes group determined by the BS itself, the BS proceeds to step 314 and determines if the ranging code transmitted from the MS is a jamming signal.

If the ranging code transmitted from the MS is determined to be the jamming signal, the BS proceeds to step 318 and notifies an operator and sets information for ranging code hopping such that the ranging code determined to be the jamming signal is not allocated to a ranging codes group. Alternatively, if the ranging code transmitted from the MS is determined not to be the jamming signal, the BS ignores the ranging code.

Then, the BS terminates the process according to the exemplary embodiment of the present invention.

Figure 4:
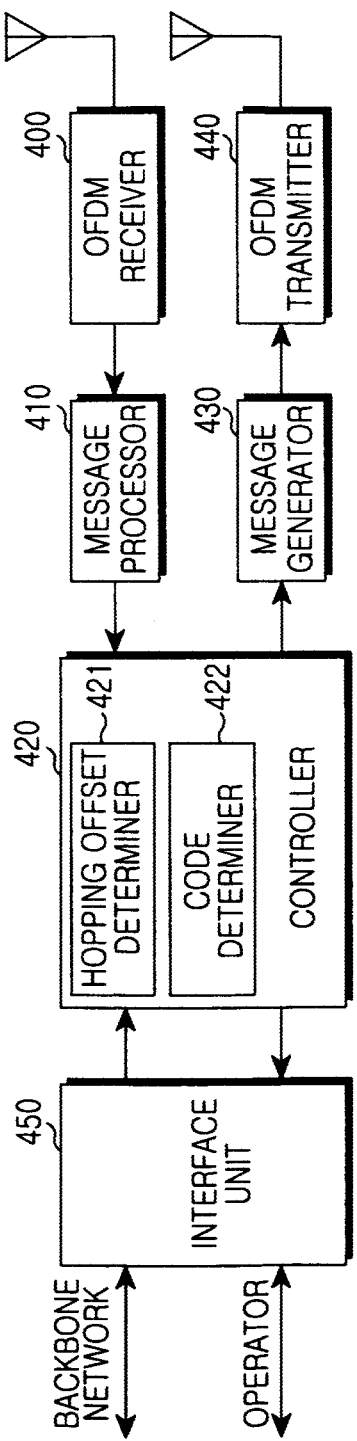
FIG. 4 illustrates a construction of a BS for ranging for a ranging code hopping in a broadband wireless access communication system according to an exemplary embodiment of the present invention.

FIG. 4 illustrates a construction of a BS for ranging for a ranging code hopping in a broadband wireless access communication system according to an exemplary embodiment of the present invention.

Referring to FIG. 4, the BS includes an Orthogonal Frequency Division Multiplexing (OFDM) receiver 400, a message processor 410, a controller 420, a message generator 430, an OFDM transmitter 440, and an interface unit 450.

The OFDM receiver 400 converts a Radio Frequency (RF) signal received from an MS into a baseband signal, converts the baseband analog signal into digital sample data, and OFDM-demodulates the sample data. Here, the OFDM demodulation represents an inclusion of Cyclic Prefix (CP) elimination, Fast Fourier Transform (FFT) operation, and the like. For instance, the OFDM receiver 400 receives a control signal necessary for ranging procedure and a ranging code from the MS. The message processor 410 analyzes a control message input from the OFDM receiver 400 and provides its result to the controller 420.

The controller 420 controls a general BS operation. In the present invention, the controller 420 performs a ranging procedure using information for ranging code hopping provided by an operator or set as a default. For the sake of this, the controller 420 includes a hopping offset determiner 421 and a code determiner 422 for the sake of the ranging code hopping.

The hopping offset determiner 421 determines a hopping offset value that is a start of a ranging codes group using the information for ranging code hopping shown in Table 1 as given in Equation 1 or Equation 2 above. For example, the hopping offset determiner 421 determines the hopping offset value every hopping period by taking a BSID, an MSB (24-p) of a corresponding frame number, a hopping offset key (K) value, etc. as input variables and using a hash function (f(•)) defined according to a hash polynomial defined in 'hopping of ranging codes group'.

The code determiner 422 determines a ranging codes group from a hopping offset value from the hopping offset determiner 421, and selects at least one or more ranging codes from the ranging codes group.

Also, the controller 420 compares a ranging code received from a corresponding MS with ranging codes of the ranging codes group determined from the code determiner 422, and determines if the received ranging code is a jamming signal. If the ranging code received from the MS is determined to be the jamming signal, the controller 420 notifies the operator or allows the ranging code determined to be the jamming signal not to be subsequently included in the ranging codes group.

The message generator 430 generates a message by various kinds of information provided through the controller 420 and outputs the generated message to the OFDM transmitter 440.

The OFDM transmitter 440 OFDM-modulates data from the message generator 430 and generates an OFDM symbol. Here, the OFDM modulation represents an inclusion of Inverse Fast Fourier Transform (IFFT) operation, CP insertion, and the like. The OFDM transmitter 440 converts an OFDM symbol into an analog signal, converts a baseband signal into an RF signal, and transmits the signal through an antenna.

The interface unit 450 provides an interface capable of transmitting/receiving data to/from a backbone network, and provides a control command from the operator to the controller 420.

Figure 5:
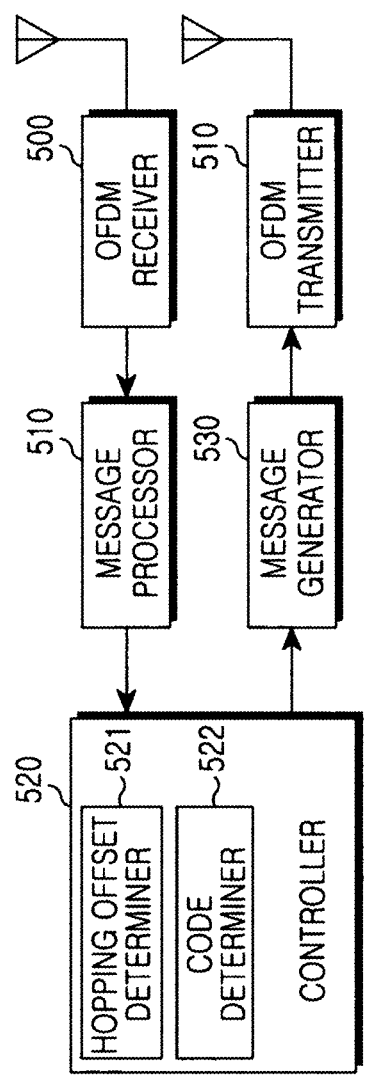
FIG. 5 illustrates a construction of an MS for ranging for a ranging code hopping in a broadband wireless access communication system according to an exemplary embodiment of the present invention.

FIG. 5 illustrates a construction of an MS for ranging for a ranging code hopping in a broadband wireless access communication system according to an exemplary embodiment of the present invention.

Referring to FIG. 5, the MS includes an OFDM receiver 500, a message processor 510, a controller 520, a message generator 530, and an OFDM transmitter 540.

The OFDM receiver 500, the message processor 510, the message generator 530, and the OFDM transmitter 540 are similar with those of FIG. 4 and thus, their detailed descriptions refer to FIG. 4.

The controller 520 controls a general MS operation. In the present invention, particularly, the controller 520 receives information for ranging code hopping shown in Table 1 from a BS, and performs ranging code hopping every hopping period. For the sake of this, the controller 520 includes a hopping offset determiner 521 and a code determiner 522 for the ranging code hopping.

The hopping offset determiner 521 determines a hopping offset value that is a start of a ranging codes group, using the information for ranging code hopping shown in Table 1 received from the BS as given in Equation 1 or Equation 2.

For example, the hopping offset determiner 521 determines the hopping offset value every hopping period by taking a BSID, an MSB (24-p) of a corresponding frame number, a hopping offset key (K) value, and so for the, as input variables and using a hash function (f(•)) defined according to a hash polynomial defined in 'hopping of ranging codes group'.

The code determiner 522 determines a ranging codes group from the hopping offset value of the hopping offset determiner 521, and selects at least one or more ranging codes from the ranging codes group.

As described above, an exemplary embodiment of the present invention has an advantage of capable of making preparations for a ranging code attack of a malicious MS and performing an admission control in a physical layer, by performing ranging code hoping in a broadband wireless communication system. Also, the exemplary embodiment of the present invention can save more wireless resources than in a scheme of an admission control of an upper layer. Additionally, the exemplary embodiment of the present invention can differently set a ranging codes group every BS without updating a separate control message.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An operation method of a Base Station (BS) for ranging in a broadband wireless access communication system, the method comprising:
    transmitting information for ranging code hopping to a Mobile Station (MS), wherein the information comprises a hash function to change a hopping offset value in every predefined period to detect a jamming signal;
    determining the hopping offset value using the hash function, wherein the hopping offset value is changed in the every predefined period;
    determining a ranging codes group using the hopping offset value;
    determining that the ranging codes group includes a ranging code transmitted by the MS; and
    when the ranging code transmitted by the MS is not included in the ranging codes group, determining the ranging code transmitted by the MS is the jamming signal.

2. The method of claim 1, wherein the hash function takes a most significant bit (MSB) of a frame number as one of a plurality of input variables.

3. The method of claim 1, wherein the information for ranging code hopping further comprises at least one of a hopping indicator indicating supporting or non-supporting of ranging code hopping, and a ranging code hopping period.

4. The method of claim 1, further comprising,
    when the ranging code transmitted by the MS is included in the ranging codes group, performing an UpLink (UL) synchronization acquisition and power control.

5. The method of claim 1, further comprising after elapse of every predefined period:
    determining a subsequent hopping offset value using the information for ranging code hopping;
    determining a subsequent ranging codes group using the subsequent hopping offset value; and
    comparing at least a subset of ranging codes of the determined subsequent ranging codes group with a subsequent ranging code transmitted by the MS.

6. An operation method of a Mobile Station (MS) for ranging in a broadband wireless access communication system, the method comprising:
    receiving information for ranging code hopping from a Base Station (BS), wherein the information comprises a hash function to change a hopping offset value in every predefined period;
    determining the hopping offset value using the hash function, wherein the hopping offset value is changed in the every predefined period to detect a jamming signal;
    determining a ranging codes group using the hopping offset value;
    selecting at least one ranging code from among the ranging codes group; and
    transmitting the at least one selected ranging code to the BS.

7. The method of claim 6, wherein the hash function takes a most significant bit (MSB) of a frame number as one of a plurality of input variables.

8. The method of claim 6, wherein the information for ranging code hopping further comprises at least one of a hopping indicator indicating supporting or non-supporting of ranging code hopping, and a ranging code hopping period.

9. The method of claim 6, further comprising: after elapse of every predefined period,
    determining a subsequent hopping offset value using the information for ranging code hopping;
    determining a subsequent ranging codes group using the subsequent hopping offset value;
    selecting at least one subsequent ranging code from among the determined subsequent ranging codes group; and
    transmitting the at least one selected subsequent ranging code to the BS.

10. An operation method of a Base Station (BS) for ranging in a broadband wireless access communication system, the method comprising:
    determining, for use in a specified hopping period, a hopping offset value to be applied to a default starting value of a first ranging code in a ranging codes group, wherein the hopping offset value is changed in every hopping period to detect a jamming signal;
    determining, for the specified hopping period, the ranging codes group using the hopping offset value;
    receiving a ranging code from a Mobile Station (MS) during the specified hopping period;
    determining whether the received ranging code of the MS is included in the ranging codes group; and
    when the ranging code transmitted by the MS is not included in the ranging codes group, determining the ranging code transmitted by the MS is the jamming signal and disallowing the received ranging code of the MS from being included in a subsequent ranging codes group.

11. The method of claim 10, further comprising performing ranging code hopping by varying the hopping offset value for each subsequent hopping period.

12. The method of claim 10, further comprising updating the ranging codes group by ranging code hopping in the every hopping period.

13. A Base Station (BS) apparatus for ranging in a broadband wireless access communication system, the apparatus comprising:
a transmitter configured to transmit information for ranging code hopping to a Mobile Station (MS), wherein the information comprises a hash function to change a hopping offset value in every predefined period;
a hopping offset determiner configured to determine the hopping offset value using the hash function, wherein the hopping offset value is changed in the every predefined period to detect a jamming signal;
a code determiner configured to determine a ranging codes group using the hopping offset value; and
a controller configured to determine whether the ranging codes group includes a ranging code transmitted by the MS and, when the ranging code transmitted by the MS is not included in the ranging codes group, determine the ranging code transmitted by the MS is the jamming signal.

14. The apparatus of claim 13, wherein the hash function takes a most significant bit (MSB) of a frame number as one of a plurality of input variables.

15. The apparatus of claim 13, wherein the information for ranging code hopping further comprises at least one of a hopping indicator indicating supporting or non-supporting of ranging code hopping, and a ranging code hopping period.

16. The apparatus of claim 13, wherein, when the ranging code transmitted by the MS is included in the ranging codes group the controller is further configured to perform an UpLink (UL) synchronization acquisition and power control.

17. A Mobile Station (MS) apparatus for ranging in a broadband wireless access communication system, the apparatus comprising:
a receiver configured to receive information for ranging code hopping from a Base Station (BS), wherein the information comprises a hash function to change a hopping offset value in every predefined period;
a hopping offset determiner configured to determine the hopping offset value using the hash function, wherein the hopping offset value is changed in the every predefined period to detect a jamming signal;
a code determiner configured to determine a ranging codes group using the hopping offset value; and
a controller configured to select at least one ranging code from among the ranging codes group and to transmit the at least one selected ranging code to the BS.

18. The apparatus of claim 17, wherein the controller is further configured to determine when a predefined period has elapsed, and when the controller determines that the predefined period has elapsed, the hopping offset determiner is further configured to determine a subsequent hopping offset value.

19. The apparatus of claim 17, wherein the information for ranging code hopping further comprises at least one of a hopping indicator indicating supporting or non-supporting of ranging code hopping and a ranging code hopping period.

20. A Base Station (BS) apparatus for ranging in a broadband wireless access communication system, the apparatus comprising:
a receiver configured to receive a ranging code from a Mobile Station (MS) during a specified hopping period; and
a controller configured to;
based on a hopping offset value determined for the specified hopping period, determine a ranging codes group for the specified hopping period by applying the hopping offset value for the specified hopping period to a default starting value of a first ranging code in the ranging codes group, wherein the hopping offset value is changed in every hopping period to detect a jamming signal; and
determine whether the received ranging code of the MS is included in the ranging codes group for the specified hopping period, and when the ranging code transmitted by the MS is not included in the ranging codes group, to determine the ranging code transmitted by the MS is the jamming signal and disallow the received ranging code of the MS from being included in a subsequent ranging codes group determined for a subsequent hopping period.

21. The apparatus of claim 20, wherein the controller is further configured to perform ranging code hopping by varying the hopping offset value for each subsequent hopping period.

22. The apparatus of claim 20, further comprising a code determiner configured to update the ranging codes group by ranging code hopping in the every hopping period.

23. A method for ranging in a broadband wireless access communication system, the method comprising:
determining, by a controller, a ranging code hopping period using information for ranging code hopping, wherein the information comprises a hash function to change a hopping offset value in every ranging code hopping period;
determining, by the controller, whether the ranging code hopping period has elapsed;
when the controller determines that the ranging code hopping period has elapsed, determining, by a hopping offset determiner, the hopping offset value using the hash function, wherein the hopping offset value is changed in the every ranging code hopping period to detect a jamming signal; and
applying, by a code determiner, the hopping offset value to a default starting value of a first ranging code in a ranging codes group.

24. The method of claim 23, wherein the ranging codes group comprises at least one of an initial ranging codes group, a periodic ranging codes group, a bandwidth request ranging codes group, and a handover ranging codes group.

25. The method of claim 23, wherein the hopping offset value is determined by:

$$H = f(BSID|F_p)|\mod 256$$

where,
BSID: identification of a BS,
mod: modular operation,
$f(\bullet)$: hash function,
$F_p$: most significant bit of corresponding frame number, and
p: hopping period.

26. The method of claim 23, wherein the hopping offset value is determined by:

$$H' = g(Dot16KDF(BSID|K|F_p, 64))|\mod 256$$

where,
g(x): hash function defined by vendor,
K: hopping offset key,
$F_p$: most significant bit of a corresponding frame number, and
Dot16KDF: key derivation function.

27. An operation method of a Base Station (BS) for ranging in a broadband wireless access communication system, the method comprising:

receiving a same ranging code from a Mobile Station (MS) a plurality of times;

identifying, each time the ranging code is received, whether a ranging codes group comprises the received ranging code, wherein the ranging codes group is changed every predefined period by ranging code hopping that is performed by applying a hopping offset value determined for each period to a default starting value of a first ranging code in the ranging codes group, wherein the hopping offset value is changed in the every predefined period to detect a jamming signal;

determining the hopping offset value using a hash function;

determining a number of times the ranging code is received without the ranging codes group comprising the received ranging code; and when the number of times the ranging code is received without the ranging codes group comprising the received ranging code is equal to or more than a predetermined number, determining the ranging code is the jamming signal and notifying an operator.

28. The method of claim 27, wherein the ranging codes group is one of an initial ranging codes group, a periodic ranging codes group, a bandwidth request ranging codes group, and a handover ranging codes group.

29. An operation method of a Base Station (BS) for ranging in a broadband wireless access communication system, the method comprising:

receiving a ranging code from a Mobile Station (MS) during a specified period;

identifying when a ranging codes group determined for the specified period comprises the received ranging code, wherein the ranging codes group is changed every predefined period by ranging code hopping that is performed by applying a hopping offset value determined for each period to a default starting value of a first ranging code in the ranging codes group, wherein the hopping offset value is changed in the every predefined period to detect a jamming signal;

determining the hopping offset value using a hash function; and performing an admission control for the MS based on whether the ranging codes group for the specified period comprises the received ranging code.

30. The method of claim 29, wherein the ranging codes group is one of an initial ranging codes group, a periodic ranging codes group, a bandwidth request ranging codes group, and a handover ranging codes group.

* * * * *